(12) United States Patent
Wern et al.

(10) Patent No.: US 8,075,024 B2
(45) Date of Patent: Dec. 13, 2011

(54) COUPLING ASSEMBLY

(75) Inventors: David E. Wern, Highlands Ranch, CO (US); Clifton P. Breay, Littleton, CO (US); Richard L. Statler, III, Denver, CO (US)

(73) Assignee: Eaton Corporation, Cleveland, OH (US)

( * ) Notice: Subject to any disclaimer, the term of this patent is extended or adjusted under 35 U.S.C. 154(b) by 329 days.

(21) Appl. No.: 12/164,731

(22) Filed: Jun. 30, 2008

(65) Prior Publication Data

US 2009/0322078 A1    Dec. 31, 2009

(51) Int. Cl.
*F16L 21/02* (2006.01)
(52) U.S. Cl. .......... 285/373; 285/87; 285/364; 285/407; 285/420
(58) Field of Classification Search ............ 285/406, 285/420, 407, 365, 364, 373, 2, 3, 117, 81, 285/82, 87, 88, 91; 24/265 WS, 24, 20 R, 24/21, 23 B, 20 S; 16/366, 368, 369, 370, 16/294, 302, 231, 380; 403/289, 290, 374.5; 411/447
See application file for complete search history.

(56) References Cited

U.S. PATENT DOCUMENTS

| | | | |
|---|---|---|---|
| 1,864,666 A * | 6/1932 | Osborne | 285/87 |
| 2,006,813 A * | 7/1935 | Powers | 411/447 |
| 2,246,358 A * | 6/1941 | Jelinek et al. | 16/366 |
| 3,999,825 A | 12/1976 | Cannon | |
| 4,881,760 A * | 11/1989 | Runkles et al. | 285/373 |
| 4,900,070 A | 2/1990 | Runkles et al. | |
| 5,620,210 A | 4/1997 | Eyster et al. | |
| 6,880,859 B2 | 4/2005 | Breay et al. | |
| 6,883,836 B2 | 4/2005 | Breay et al. | |
| 6,971,682 B2 | 12/2005 | Hoang et al. | |
| 2004/0207197 A1 | 10/2004 | Hoang et al. | |
| 2005/0023824 A1 | 2/2005 | Breay et al. | |
| 2007/0138337 A1 * | 6/2007 | Audart-Noel et al. | |

OTHER PUBLICATIONS

International Search Report and Written Opinion of International Searching Authority; International Application No. PCT/IB2009/006067; International Filing Date Jun. 26, 2009; Authorized Officer Mauries, Laurent; (Nov. 27, 2009).

* cited by examiner

*Primary Examiner* — James M Hewitt
*Assistant Examiner* — Jay R Ripley
(74) *Attorney, Agent, or Firm* — Benesch, Friedlander Coplan & Aronoff LLP

(57) ABSTRACT

A coupling assembly for releasably interconnecting a fluid joint. The fluid joint includes confronting ends of a pair of fluid conveying members, each of which has a ferrule fixedly attached thereto, and a sleeve circumferentially surrounding the ferrules. The coupling assembly includes a pair of coupling members, a hinge assembly configured to hingedly connect the first ends of the coupling members to permit them to rotate relative to each other between an open position and a closed position where the coupling members surround the sleeve, a pair of bonding wires, each of which is coupled to a respective coupling member and configured to electrically bond the respective coupling member to the ferrules of respective fluid conveying members, and a releasable latching assembly configured to releasably secure the second ends of the coupling members together when they are in their closed position.

18 Claims, 11 Drawing Sheets

COUPLING ASSEMBLY

BACKGROUND

1. Field of the Invention

The present application relates to coupling assemblies for interconnecting confronting ends of a pair of fluid conveying members, and more particularly, to a clamshell variety coupling assembly for interconnecting confronting ends of a pair of fluid conveying members.

2. Description of the Related Art

There are a number of prior art couplings that are used for interconnecting various types of fluid conveying lines or conduits. Depending upon the type of fluid to be conveyed, the prior art couplings may be designed to handle special safety requirements. Particularly for conduits which convey fuel, there is always a concern for designing a coupling so that an electrostatic charge does not build up on one of the coupled sections of the line. A stored electrostatic charge may give rise to the hazard of an electrical spark in the presence of vaporized fuel. Discharge of the spark by grounding or by flexing of the coupling in such a manner to bring electrically bonded parts of the coupling out of contact with one another may cause instantaneous combustion of any vaporized fuel which in turn can cause ignition of the fuel conveyed in the lines. Buildup of an electrostatic charge by ionization of fuel as it is conveyed through the fuel lines can be referred to as a static buildup of an electric charge. Lightning strikes can also create a spark and such strikes are commonly referred to as dynamic causes for creating an electrical charge. Thus, a coupling should also have the capability to dissipate a dynamic electrical charge, such as one caused by a lightning strike. Particularly for lightning strikes, it is important that the coupling have the capability to quickly dissipate the electrical charge due to the potential magnitude of a spark caused by the lightning strike.

Despite the advances in coupling designs, most fluid conveying lines still utilize metallic flanges which are sealed to the coupling by deformable o-rings. These type of sealing rings may electrically insulate the coupled sections of the line from each other, thus any ionization of fuel that flows through the lines may give rise to a differential electrostatic charge between the coupled sections, which creates a spark gap. Accordingly, there is still a need to ensure electrical conductivity across the coupled sections of the fuel lines to prevent electrostatic buildup to reduce the complexity, cost, and size of the coupling as well as improve overall performance.

SUMMARY

In one embodiment, a coupling assembly for releasably interconnecting a fluid joint is provided where the fluid joint includes confronting ends of a pair of fluid conveying members, each of which has a ferrule fixedly attached thereto, and a sleeve circumferentially surrounding the ferrules. The coupling assembly includes a pair of coupling members, each of which has a first end and a second end, a hinge assembly configured to hingedly connect the first ends of the coupling members to permit them to rotate relative to each other between an open position and a closed position where the coupling members surround the sleeve, a pair of bonding wires, each of which is coupled to a respective coupling member and configured to electrically bond the respective coupling member to the ferrules of respective fluid conveying members, a releasable latching assembly configured to releasably secure the second ends of the coupling members together when they are in their closed position, and a pair of bonding members, each of which is externally mounted to a respective coupling member and configured to electrically bond the respective coupling member to the sleeve.

In another embodiment, a coupling assembly for releasably interconnecting a fluid joint is provided, where the fluid joint includes confronting ends of a pair of fluid conveying members and a sleeve circumferentially surrounding the ends. The coupling assembly includes a pair of coupling members, each of which has a first end and a second end, a hinge assembly configured to hingedly connect the first ends of the coupling members to permit them to rotate relative to each other between an open position and a closed position where the coupling members surround the sleeve, a pair of bonding wires, each of which is coupled to a respective coupling member and configured to electrically bond the respective coupling member to the ends of respective fluid conveying members, a releasable latching assembly configured to releasably secure the second ends of the coupling members together when they are in their closed position, and a latch indicator configured to be moved to a closed position over the releasable latching assembly only when the second ends of the coupling members are secured together by the releasable latching assembly.

In another embodiment, a coupling assembly for releasably interconnecting a fluid joint is provided, where the fluid joint includes confronting ends of a pair of fluid conveying members, each of which has a ferrule fixedly attached thereto, and a sleeve circumferentially surrounding the ferrules. The coupling assembly includes a pair of coupling members, each of which has a first end and a second end, a hinge assembly configured to hingedly connect the first ends of the coupling members to permit them to rotate relative to each other between an open position and a closed position where the coupling members surround the sleeve, a pair of bonding wires, each of which is coupled to a respective coupling member and configured to electrically bond the respective coupling member to the ferrules of respective fluid conveying members, at least a pair of latching members rotatably mounted to a first support pin attached to one of the coupling members adjacent its second end and configured to releasably engage a second support pin attached to the other coupling member adjacent its second end when the coupling members are in their closed position, and a redundant support pin structure configured to prevent inadvertent removal of the first and second support pins from their respective coupling member in the event of a hinge pin failure.

BRIEF DESCRIPTION OF THE DRAWINGS

It will be appreciated that the illustrated boundaries of components in the figures represent one example of the boundaries. One of ordinary skill in the art will appreciate that one component may be designed as multiple components or that multiple components may be designed as one component. Additionally, an internal component may be implemented as an external component and vice versa.

Further, in the accompanying drawings and description that follow, like parts are indicated throughout the drawings and description with the same reference numerals, respectively. The figures may not be drawn to scale and the proportions of certain parts have been exaggerated for convenience of illustration.

DETAILED DESCRIPTION

Figure 1:
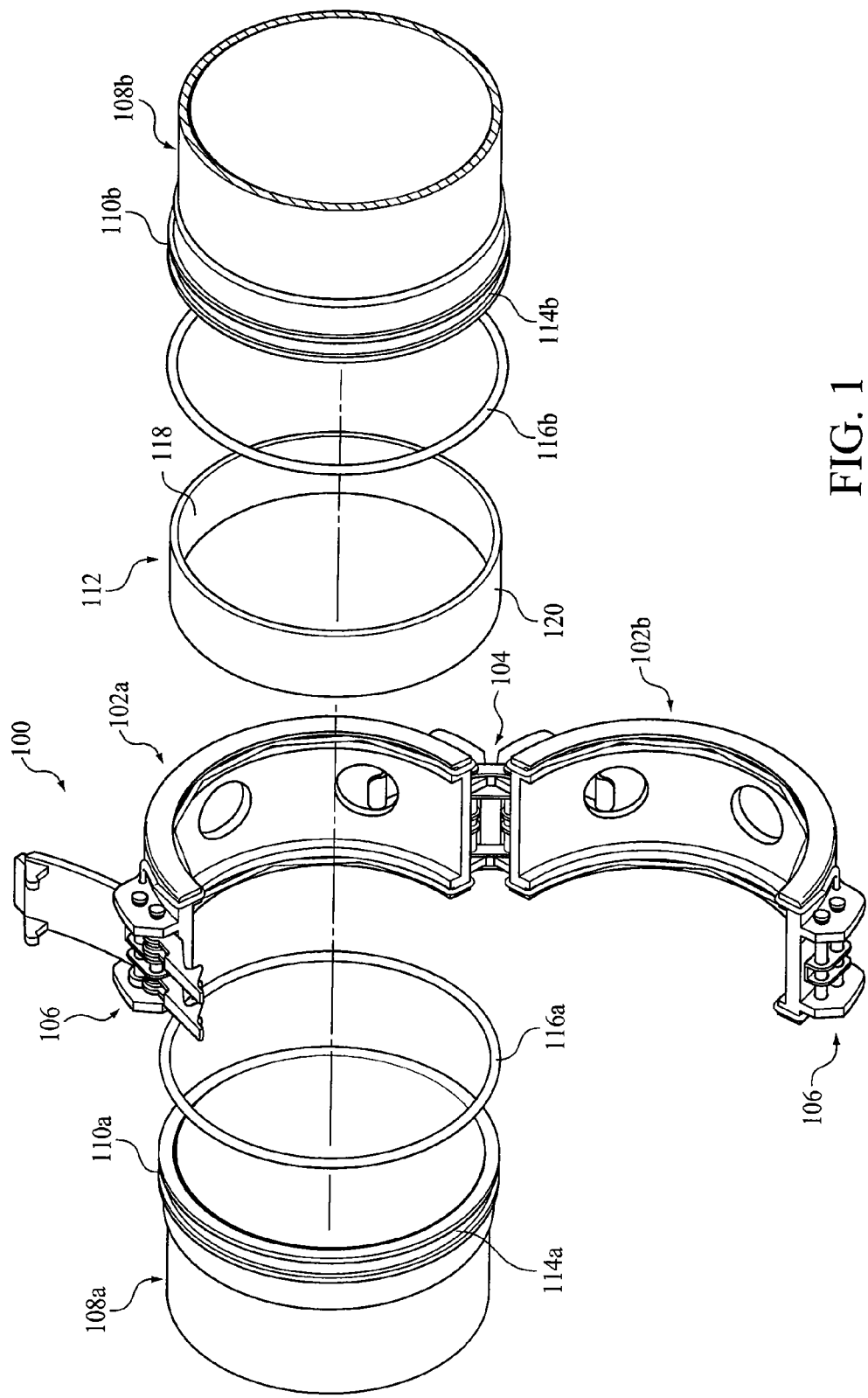
FIG. 1 illustrates an exploded perspective view of one embodiment of a clamshell coupling assembly 100 for interconnecting confronting ends of a pair of fluid conveying members 108a,b, where the coupling assembly 100 is in an open position.

Certain terminology will be used in the foregoing description for convenience in reference only and will not be limiting. The terms "forward" and "rearward" with respect to each component of the coupling assembly will refer to direction towards and away from, respectively, the coupling direction. The terms "rightward" and "leftward" will refer to directions in the drawings in connection with which the terminology is used. The terms "inwardly" and "outwardly" will refer to directions toward and away from, respectively, the geometric centerline of the coupling assembly. The terms "upward" and "downward" will refer to directions as taken in the drawings in connection with which the terminology is used. All foregoing terms mentioned above include the normal derivative and equivalents thereof.

With reference to FIGS. 1-5B, one embodiment of a coupling assembly 100 for use in a fluid conveying application, such as a low pressure aircraft fuel system, is described. The coupling assembly 100 is of the threadless, clamshell variety that includes first and second coupling members 102a,b hinged together at one respective end via a hinge assembly 104 and releasably secured together at the other respective end via a releasable latching assembly 106. The hinge assembly 104 enables the first and second coupling members 102a,b to move relative to each other between an open position (FIG. 1), where the latching assembly 106 is disengaged and the first and second coupling members 102a,b are free to move relative to each other via the hinge assembly 104, and a closed position (FIGS. 2A, 2B), where the latching assembly 106 is engaged and the coupling members 102a,b are secured together as a single continuous annular unit. In its closed position (FIGS. 2A, 2B), the coupling assembly 100 defines a central longitudinal axis A.

The coupling assembly 100 is configured to connect together a fluid joint that includes confronting ends of a pair of confronting fluid conveying members 108a,b, each end having a ferrule 110a,b (e.g., AS5833 and/or AS5837 compliant ferrules) attached to an end thereof, and a sleeve 112 (e.g., an AS5834 compliant sleeve) that is installed over and surrounds the ferrules 110a,b. Each ferrule 110a,b includes an annular channel or groove 114a,b configured to receive an annular sealing member 116a,b, such as an O-ring. The sleeve 112 is generally cylindrical in shape and includes an inner cylindrical surface 118 and an outer cylindrical surface 120.

To couple the fluid joint having confronting ends of a pair of fluid conveying members, the coupling operation begins with installing the sealing members 116a,b into respective grooves 114a,b in the ferrules 110a,b of the fluid conveying members 108a,b. Next, the ferrules 110a,b of the fluid conveying members 108a,b are moved into a confronting position with each other, such that they are positioned in close proximity or contact with each other. The sleeve 112 is then installed over the ferrules 110a,b of the fluid conveying members 108a,b, such that the sleeve 112 surrounds the ferrules 110a,b. The ferrules 110a,b of the fluid conveying members 108a,b, which are surrounded by the sleeve 112, are then placed within one of the coupling members (e.g., first coupling member 102a), and the coupling members 102a,b are rotated relative to each other towards the closed position of the coupling assembly 100.

Figure 2A:
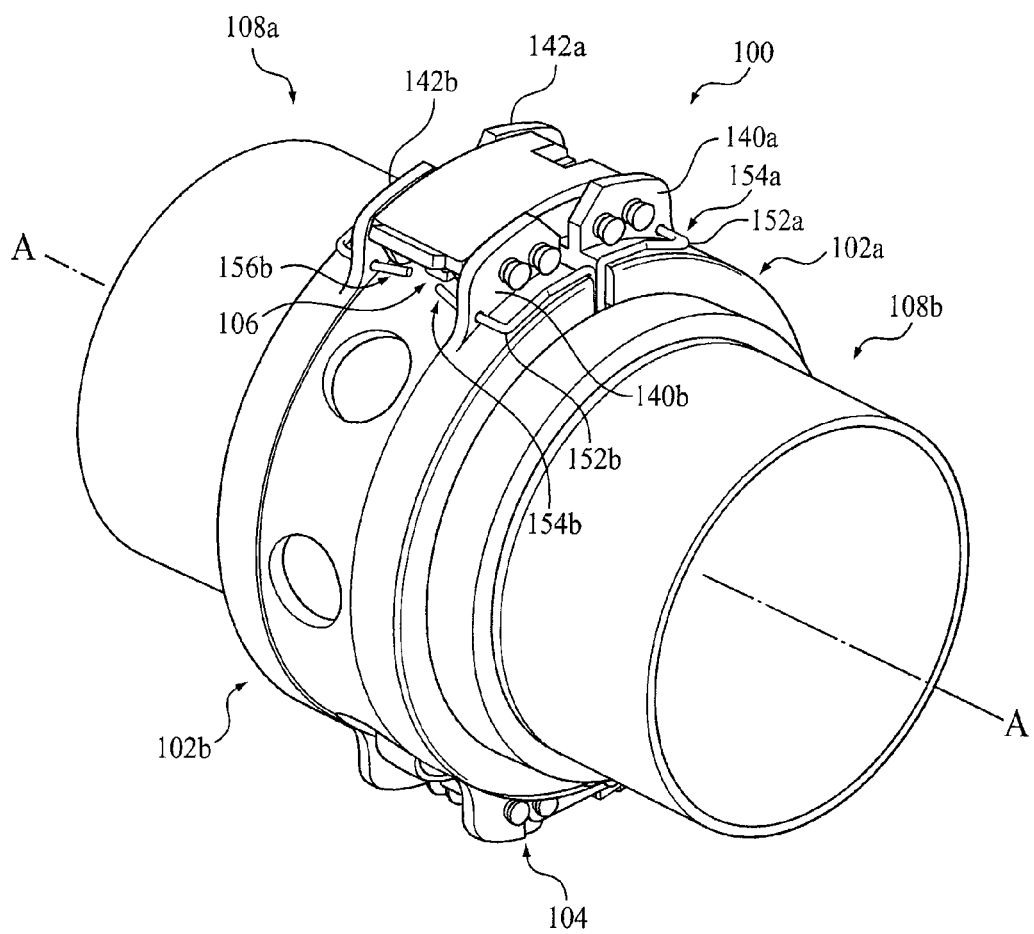
FIG. 2A illustrates a top perspective view of the coupling assembly 100 in its closed position surrounding the confronting ends of the fluid conveying members 108a,b.
Figure 2B:
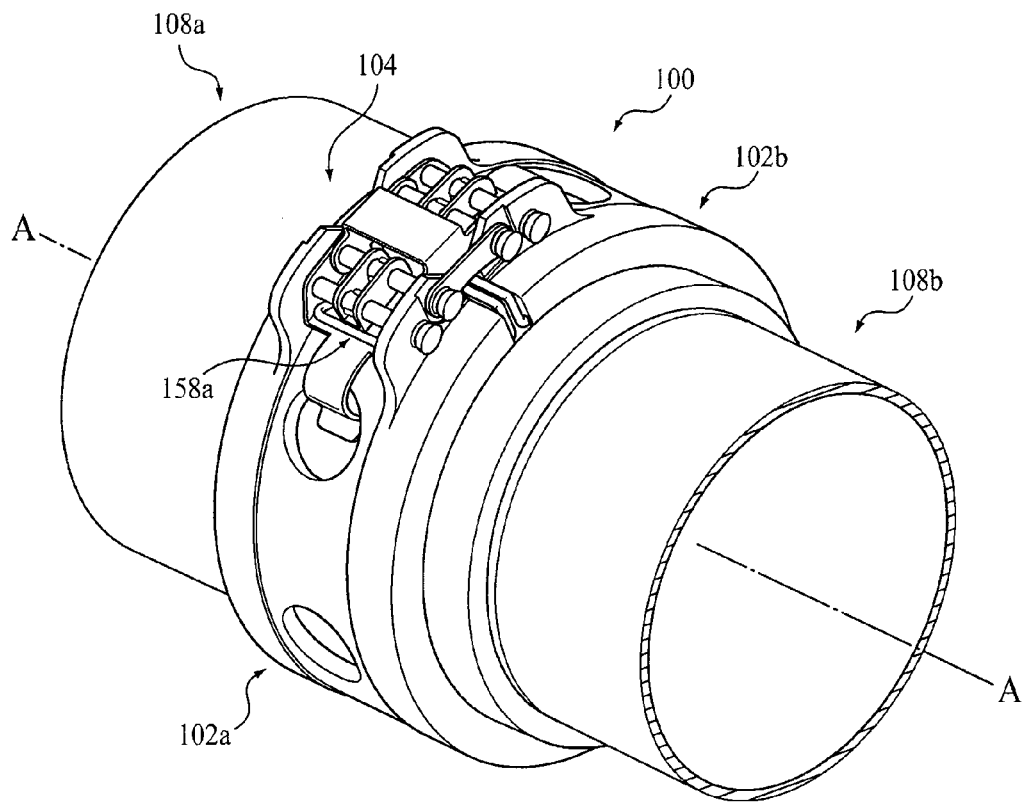
FIG. 2B illustrates a bottom perspective view of the coupling assembly 100 in its closed position surrounding the confronting ends of the fluid conveying members 108a,b.
Figure 2C:
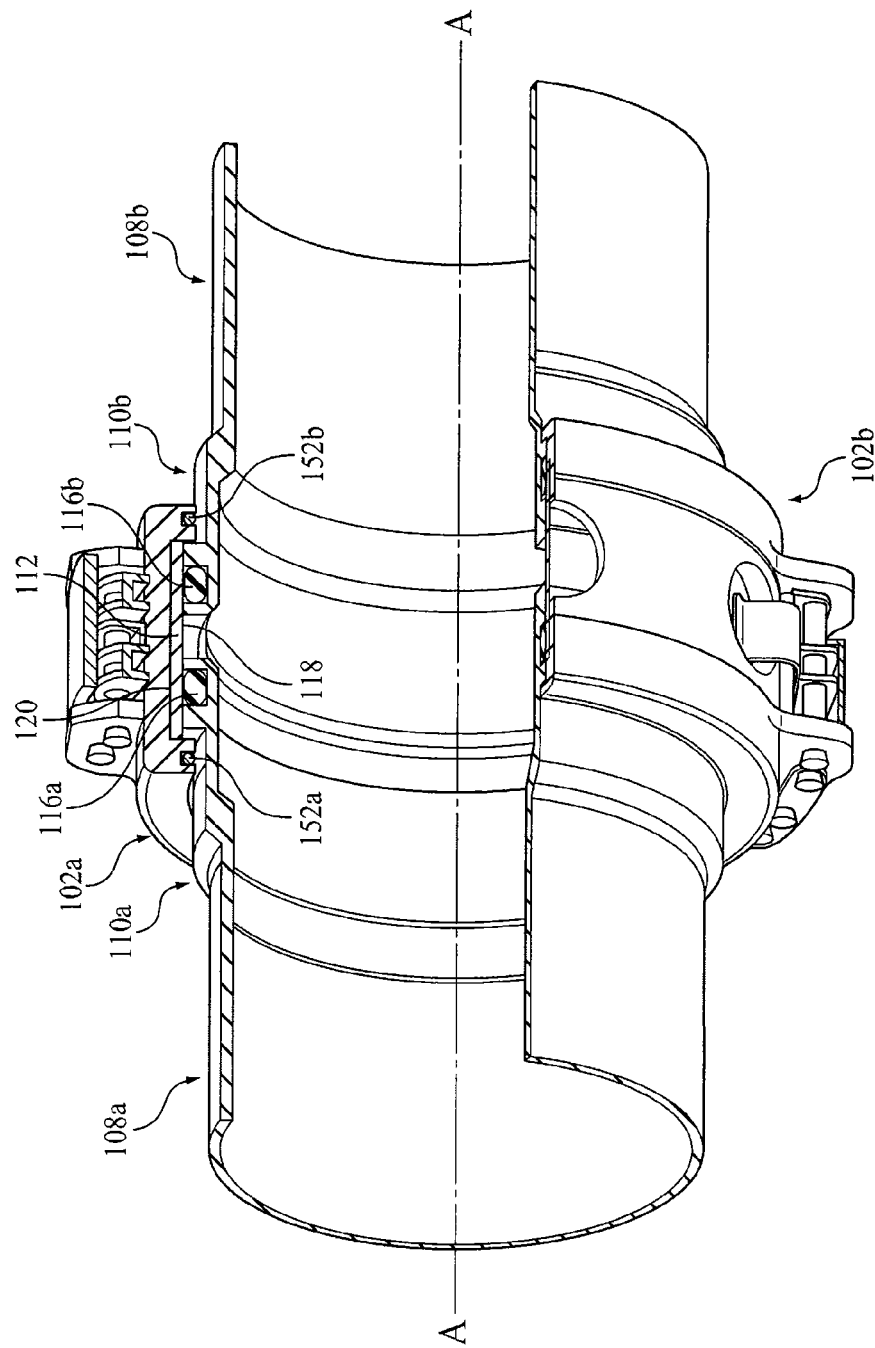
FIG. 2C illustrates a partially cut-away, front perspective view of the coupling assembly 100 in its closed position surrounding the confronting ends of the fluid conveying members 108a,b.

With reference to FIG. 2C, the sleeve 112 is sized to span or bridge the space between opposed end faces of the ferrules 110a,b, such that its inner surface 118 peripherally surrounds and seats against the sealing members 116a,b. It will be appreciated that the groove 114a,b formed in each ferrule 110a,b is sufficiently shallow to permit its respective annular sealing member 116a,b to protrude radially beyond the outer peripheral surface of the ferrule 110a,b, such that the sealing members 116a,b can be deformed against the inner surface 118 of the sleeve 112. In this manner, the sealing members 116a,b establish a fluid-tight seal between the ferrules 110a,b and the sleeve 112, while allowing for angular misalignment between the ferrules 110a,b.

Optionally, the outer surface 120 of the sleeve 112 may also be roughened in a suitable manner to enable a user to grip it more firmly during the course of assembling the sleeve 112 over the ferrules 110a,b. Alternatively, the outer surface 120 of the sleeve 112 may be provided with corrugations to provide the desired gripping surface, which keeps the sleeve 112 from slipping in the user's hand as he/she forces the sleeve 112 over the sealing member 116a,b.

It will be appreciated that the coupling assembly 100 also provides an axial adjustment between the ferrules 110a,b of the fluid conveying members 108a,b, thereby allowing the ferrules 110a,b to be located anywhere between the outer edges of the sleeve 112. Accordingly, the ferrules 110a,b may be spaced from one another as shown in FIG. 2C, or the ferrules 110a,b may be positioned so that the confronting faces of the ferrules 110a,b make contact with one another within the sleeve 112. Depending upon the particular design of the ferrules 110a,b, the ferrules 110a,b can either be spaced from one another within the sleeve 112 or can be placed in contact with one another.

Figure 3:
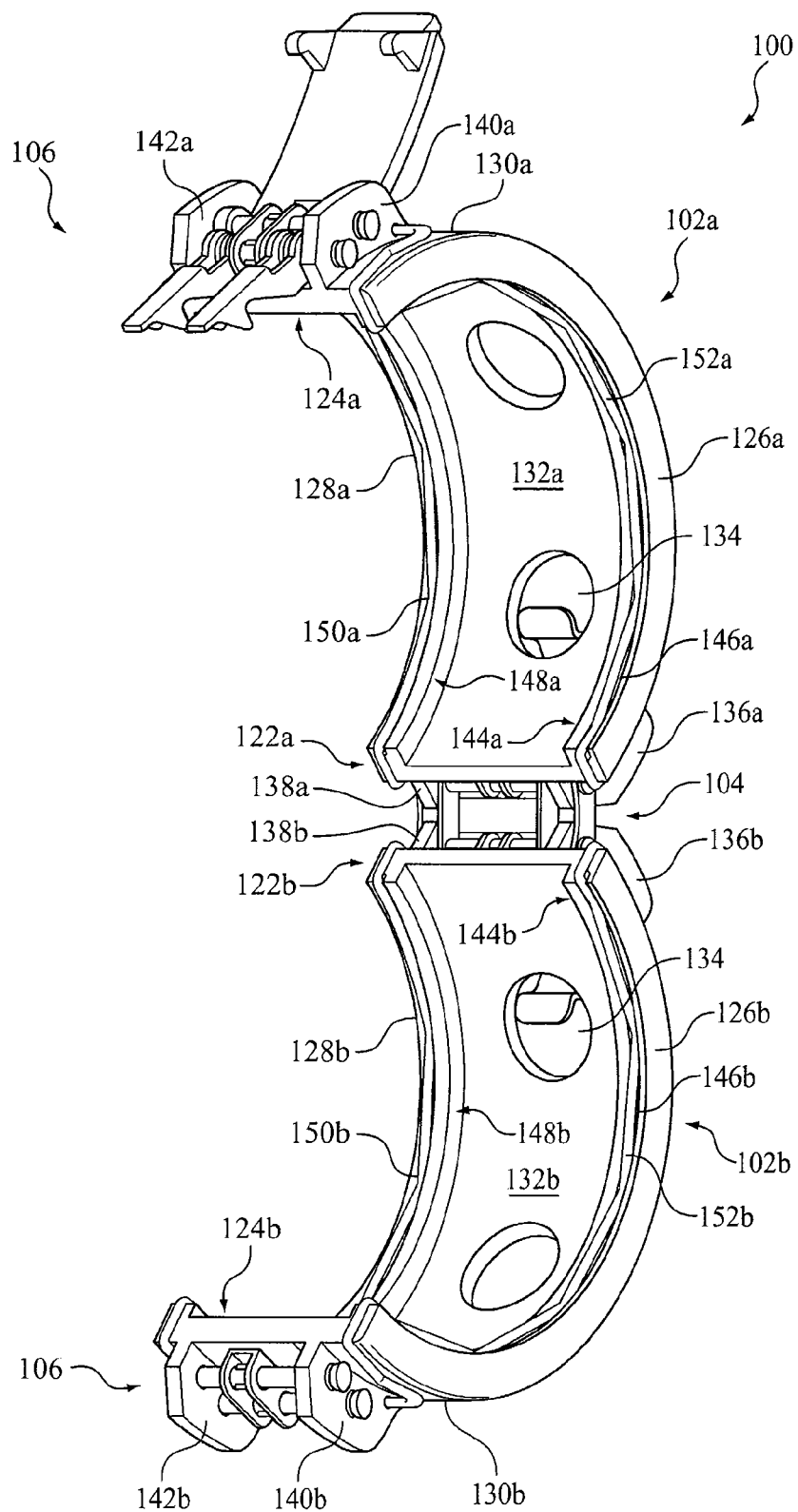
FIG. 3 illustrates a perspective view of the coupling assembly 100 in its open position.

With reference to FIG. 3, each coupling member 102a,b is generally semi-circular in shape and includes a first end 122a,b that is hingedly connected to the hinge assembly 104 and a second end 124a,b that defines a free end of each coupling member 102a,b. Each coupling member 102a,b also includes a first curved edge face 126a,b, an opposing second curved edge face 128a,b, an outer partial cylindrical surface 130a,b, and an inner partial cylindrical surface 132a,b. Extending through each coupling member 102a,b from the outer partial cylindrical surface 130a,b to the inner partial cylindrical surface 132a,b are a plurality of inspection openings 134 that allow a user to visually inspect whether the sleeve 112 is properly in place.

Extending radially outward from the outer surface 130a,b adjacent the first end 122a,b of each coupling member 102a,b are first and second opposing ears 136a,b, 138a,b that are spaced-apart in an axial direction from each other. Similarly, extending radially outward from the outer surface 130a,b adjacent the second end 124a,b of each coupling member 102a,b are third and fourth opposing ears 140a,b, 142a,b that are spaced-apart in an axial direction from each other.

With continued reference to FIG. 3, extending radially inward from the inner surface 132a,b adjacent the first edge face 126a,b of each coupling member 102a,b is a first lip 144a,b having an inwardly facing annular groove 146a,b formed therein. Similarly, extending radially inward from the inner surface 132a,b adjacent the second edge face 128a,b of each coupling member 102a,b is a second lip 148a,b having an inwardly facing annular groove 150a,b formed therein. The first and second lips 144a,b, 148a,b of each coupling member 102a,b have an inside diameter that is less than the outside diameter of the ferrules 110a,b of the fluid conveying members 108a,b. Due to this difference in diametrical size, the first and second lips 144a,b, 148a,b serve as, among other things, stops to limit axial movement of the ferrules 110a,b of the fluid conveying members 108a,b away from each other as shown in FIG. 2C.

Positioned within the first and second grooves 146a,b, 150a,b of the first and second lips 144a,b, 148a,b of each coupling member 102a,b is a bonding jumper wire 152a,b. The bonding jumper wire 152a,b is a continuous piece of bent conductive wire that is configured to maintain electrical conductivity through the coupling assembly 100 and the fluid joint by electrically bonding the first and second lips 144a,b, 148a,b of each coupling member 102a,b to the ferrules 110a,b of respective fluid conveying members 108a,b. In one embodiment, the bonding jumper wires 152a,b are constructed of stainless steel. In another embodiment, the bonding jumper wires 152a,b are constructed of a phosphor bronze material. In other embodiments, the bonding jumper wires 152a,b can be constructed of other metallic materials.

It will be appreciated that the first and second grooves 146a,b, 150a,b are sufficiently shallow to permit bent sections of the bonding jumper wire 152a,b to protrude radially beyond the inner peripheral surface of the first and second lips 146a,b, 150a,b to provide multiple contact points with the ferrules 110a,b when the coupling assembly 100 is in its closed position. In other words, each bonding jumper wire 152a,b is dimensioned to provide a slight interference between it and the ferrules 110a,b of respective fluid conveying members 108a,b to ensure that the bonding jumper wire 152a,b contacts the ferrules 110a,b to provide electrical continuity between the first and second coupling members 102a,b and the ferrules 110a,b of the fluid conveying members 108a,b. It will also be appreciated that this interference will not affect the ability of the user to close the coupling assembly 100 with reasonable strength.

With reference back to FIG. 2A, in addition to being constrained in the first and second grooves 146a,b, 150a,b of each coupling member 102a,b, the bonding wire 152a,b is also anchored at its free ends to the third and fourth ears 140a,b, 142a,b of a respective coupling member 102a,b. Specifically, one free end 154a,b of each bonding wire 152a,b is inserted through an opening in the third ear 140a,b of a respective coupling member 102a,b and then bent after installation to prevent removal of the bonding wire 152a,b. Similarly, the other free end 156a,b of each bonding wire 152a,b is inserted through an opening in the fourth ear 142a,b of a respective coupling member 102a,b and then bent after installation to prevent removal of the bonding wire 152a,b. Additionally, the section of each bonding wire 152a,b opposite the free ends (hereinafter referred to as the "bridge section 158a,b") is captured beneath the hinge assembly 104 (FIG. 2B), which will be described in further detail below.

Figure 4A:
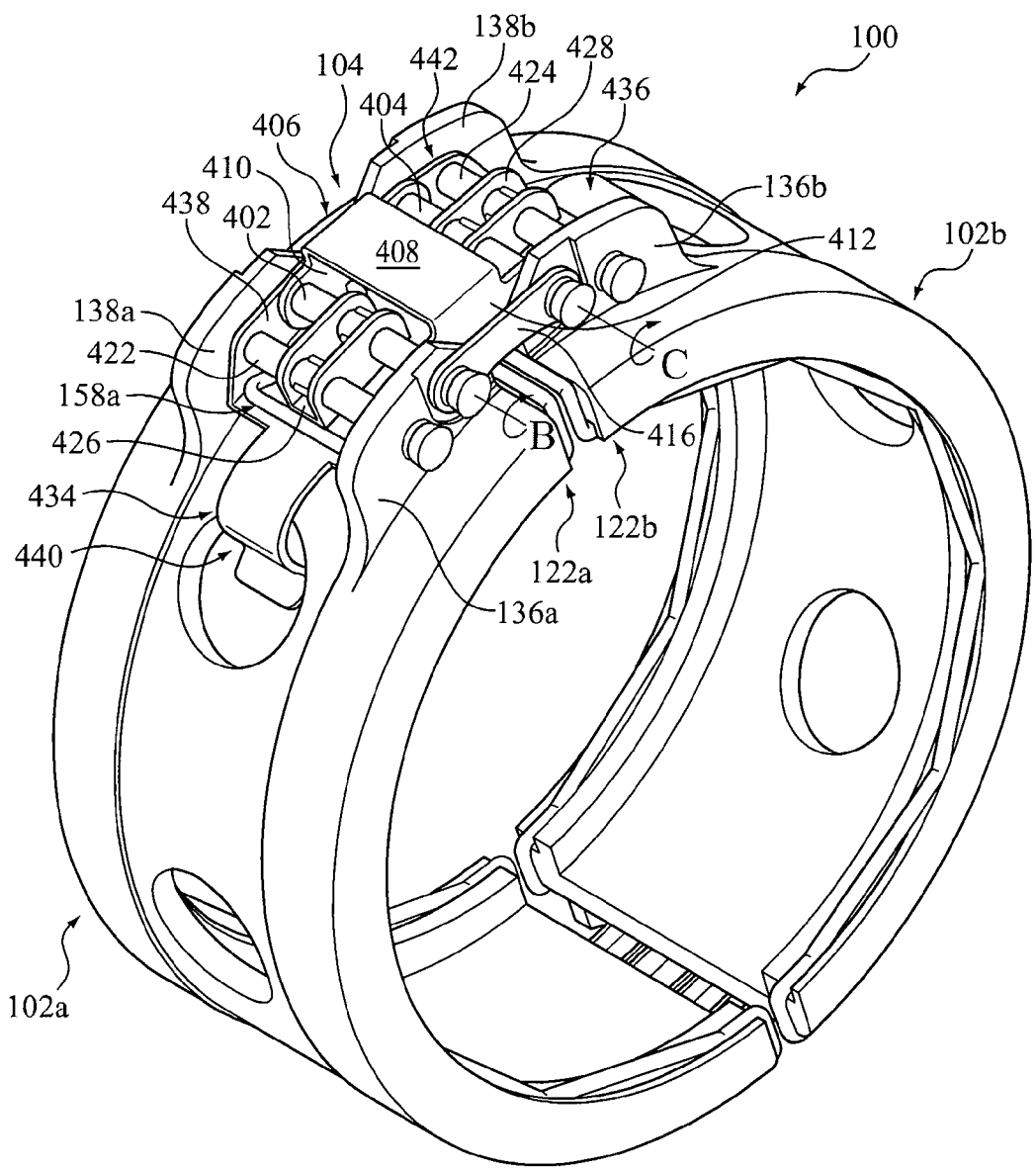
FIG. 4A illustrates a bottom perspective view of the coupling assembly 100 in its closed position.
Figure 4B:
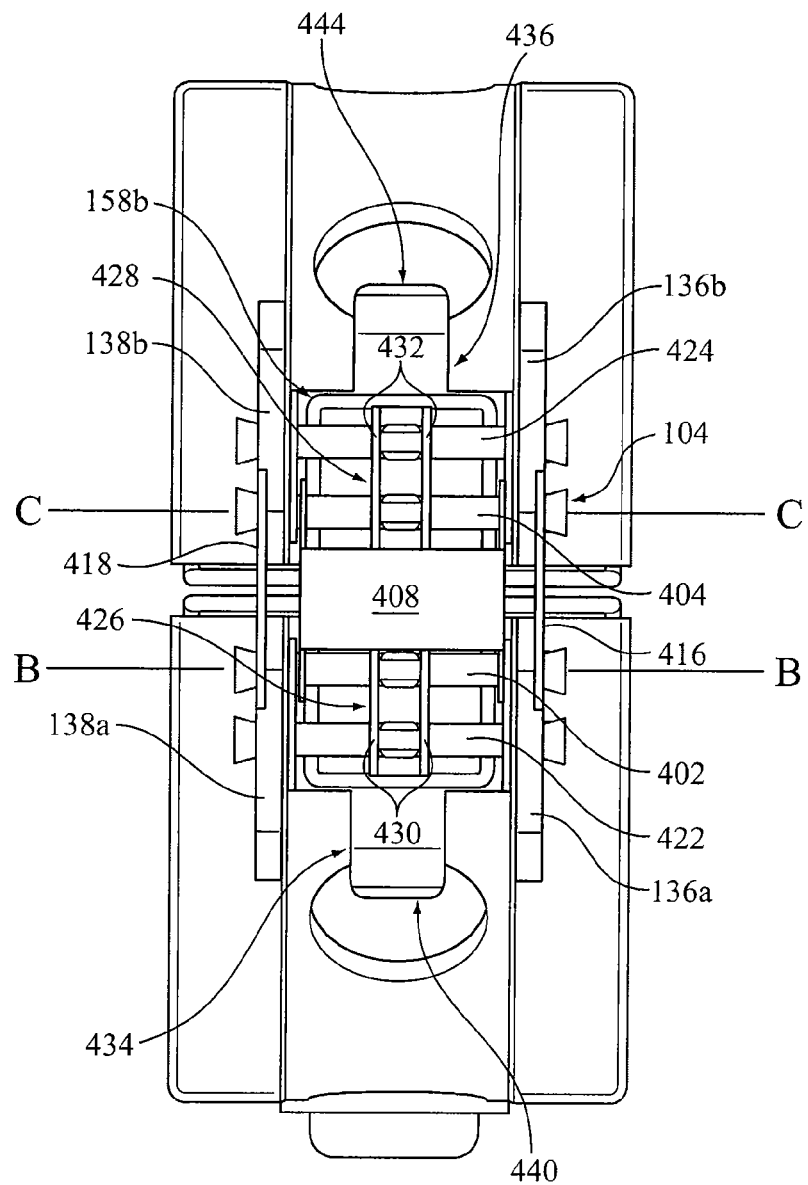
FIG. 4B illustrates a bottom plan view of the coupling assembly 100 in its closed position.

As discussed above, the coupling assembly 100 includes a hinge assembly 104 that hingedly connects the first ends 122a,b of the coupling members 102a,b. With reference to FIGS. 4A and 4B, the hinge assembly 104 includes a first axially extending hinge pin 402 that extends through openings formed in the first and second ears 136a, 138a of the first coupling member 102a and a second axially extending hinge pin 404 that extends through openings formed in the first and second ears 136b, 138b of the second coupling member 102b. The ends of the first and second hinge pins 402, 404 are enlarged (e.g., through swaging) to prevent removal of the hinge pins 402, 404 from the first and second ears 136a,b, 138a,b of the coupling members 102a,b.

The hinge assembly 104 also includes a primary hinge 406 positioned between the ears 136a,b, 138a,b of the coupling members 102a,b and having a base portion 408 and a pair of axially spaced-apart, radially inward extending portions 410, 412, each of which has openings for receiving the first and second hinge pins 402, 404. Due to this structural arrangement, the primary hinge 406 permits the first coupling member 102a to rotate about the first hinge pin 402, which defines a rotation axis B, and the second coupling member 102b to rotate about the second hinge pin 404, which defines a rotation axis C. Hence, the hinge assembly 104 enable the coupling assembly 100 to move from an open position (opening to at least 180°) to its closed position.

The hinge assembly 104 further includes a redundant hinge structure that is capable of withstanding the operating loads of the coupling assembly 100 in the event that the primary hinge 406 fails. In the illustrated embodiment, the redundant hinge assembly includes a pair of chain links (i.e., first and second chain links 416, 418) that couple the first hinge pin 402 to the second hinge pin 404. More specifically, the first chain link 416 is positioned between the first ears 136a,b of the coupling members 102a,b and the swaged hinge pin ends, and includes openings for receiving the first hinge pin 402 and the second hinge pin 404. The second chain link 418 is positioned between the second ears 138a,b of the coupling members 102a,b and the swaged hinge pin ends, and includes openings for receiving the first hinge pin 402 and the second hinge pin 404.

The hinge assembly 104 also includes a redundant hinge pin structure for preventing removal of the hinge pins from the coupling assembly 100 in the event of a hinge pin swage failure or a hinge pin fracture. The redundant hinge pin assembly includes a second pair of axially extending pins (i.e., third and fourth hinge pins 422, 424) and a pair of truss members (i.e., first and second truss members 426, 428). The third hinge pin 422 is oriented parallel to the first hinge pin 402 and extends through openings formed in the first and second ears 136a, 138a of the first coupling member 102a, while the fourth hinge pin 424 is oriented parallel to the second hinge pin 404 and extends through openings formed in the first and second ears 136b, 138b of the second coupling member 102b. The ends of the third and fourth hinge pins 422, 424 are enlarged (e.g., through swaging) to prevent removal of the hinge pins 422, 424 from the respective ears 136a,b, 138a,b of the respective coupling members 102a,b.

In the illustrated embodiment, the first truss member 426 is a generally channel-shaped structure having parallel walls 430 with openings formed therethrough for receiving the first and third hinge pins 402, 422, respectively, to effectively couple the first hinge pin 402 to the third hinge pin 422. Similarly, the second truss member 428 is a generally channel-shaped structure having parallel walls 432 having openings therethrough for receiving the second and fourth hinge pins 404, 424, respectively, to effectively couple the second hinge pin 404 to the fourth hinge pin 424. To ensure that the hinge pins cannot be removed from the coupling assembly 100 after assembly, the hinge pins are crimped or otherwise deformed between the parallel walls 430, 432 of the truss members 426, 428, respectively. In combination, the truss members 426, 428 and the crimping of the hinge pins serve as a redundant feature to prevent removal of the hinge pins from the coupling assembly 100 in the event of a hinge pin swage failure or a hinge pin fracture.

The coupling assembly 100 also includes a pair of bonding elements (first and second bonding elements 434, 436) that are configured to electrically bond the sleeve 112 to the coupling assembly 100, such that any electrical charge from the sleeve 112 is carried through to the bonding fingers 434, 436 and then electrically bonded to the bonding wires 152a,b. As shown in FIGS. 4A and 4B, the first bonding element 434 includes a mounting portion 438 that is coupled to the first and third hinge pins 402, 422 and a finger portion 440 that extends into one of the inspection holes 134 of the first coupling member 102a and makes contact with the outer surface 120 of the sleeve 112. Similarly, the second bonding element 436 includes a mounting portion 442 that is coupled to the second and fourth hinge pins 404, 424 and a finger portion 444 that extends into one of the inspection holes 134 of the second coupling member 102b and makes contact with the outer surface 120 of the sleeve 112. Preferably, the finger portions 440, 444 of the bonding elements 434, 436, respectively, are preloaded when the coupling assembly 100 is in its closed position surrounding the sleeve 112 to ensure that they make contact with the outer surface 120 of the sleeve 112.

With reference to FIGS. 4A and 4B, the bonding elements 434, 436 also assist in constraining the bonding wires 152a,b to prevent them from moving relative to a respective coupling member 102a,b. Specifically, a bridge section 158a of the first bonding wire 152a is captured between the mounting portion 438 of the first bonding element 434 and the third hinge pin 422, while the bridge section 158b of the second bonding wire 152b is captured between the mounting portion 442 of the second bonding element 436 and the fourth hinge pin 424.

As discussed above, the coupling assembly 100 includes a releasable latching assembly 106 associated with the second ends 124a,b of the coupling members 102a,b. The latching assembly 106 is configured to releasably secure together the coupling members 102a,b to lock the coupling assembly 100 in its closed position, when the second ends 124a,b are placed in a confronting position with respect to each other.

Figure 5A:
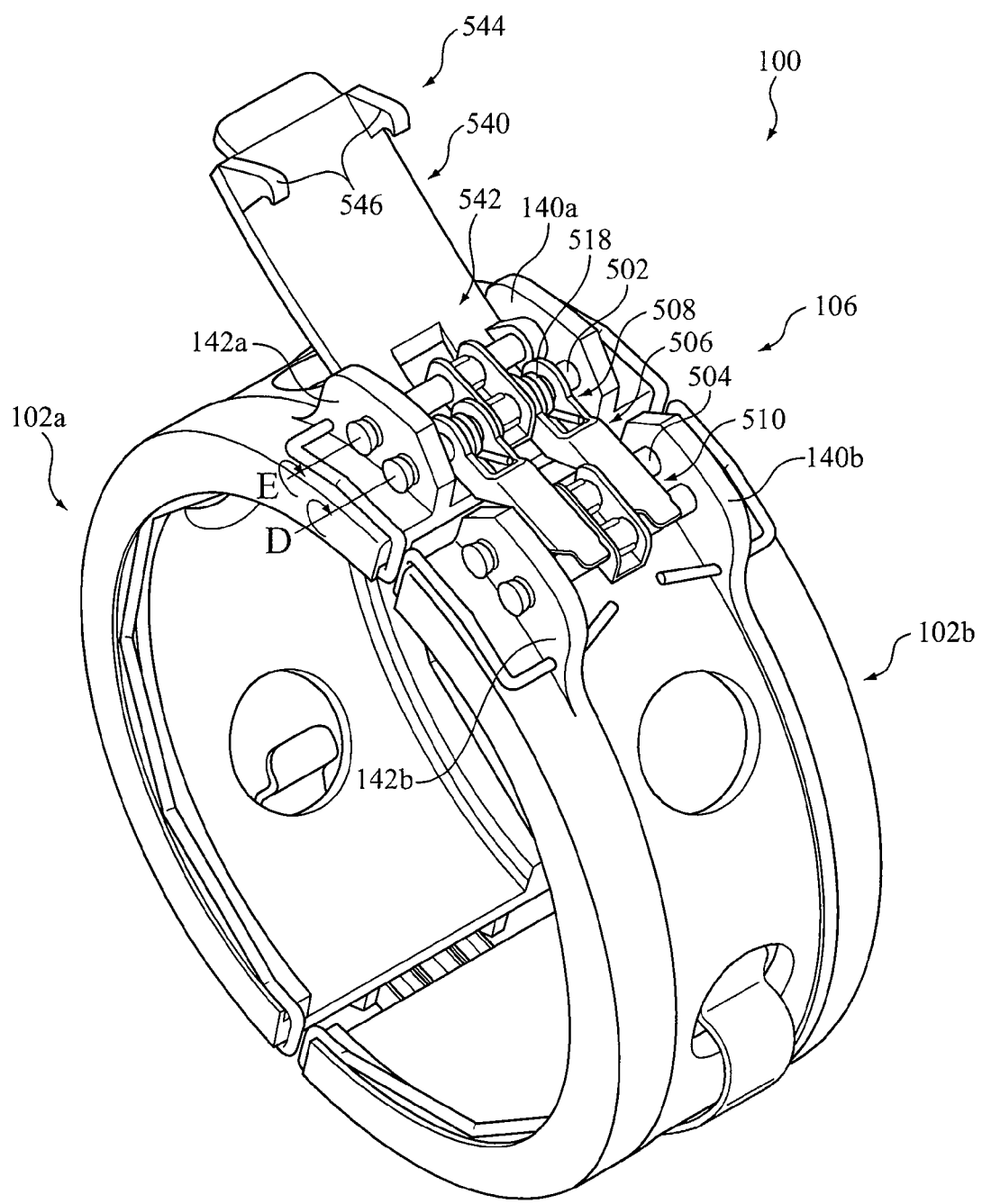
FIG. 5A illustrates a top perspective view of the releasable latching assembly 106 of the coupling assembly 100, where the first and second coupling members 102a,b are latched together via the latching assembly 106.
Figure 5B:
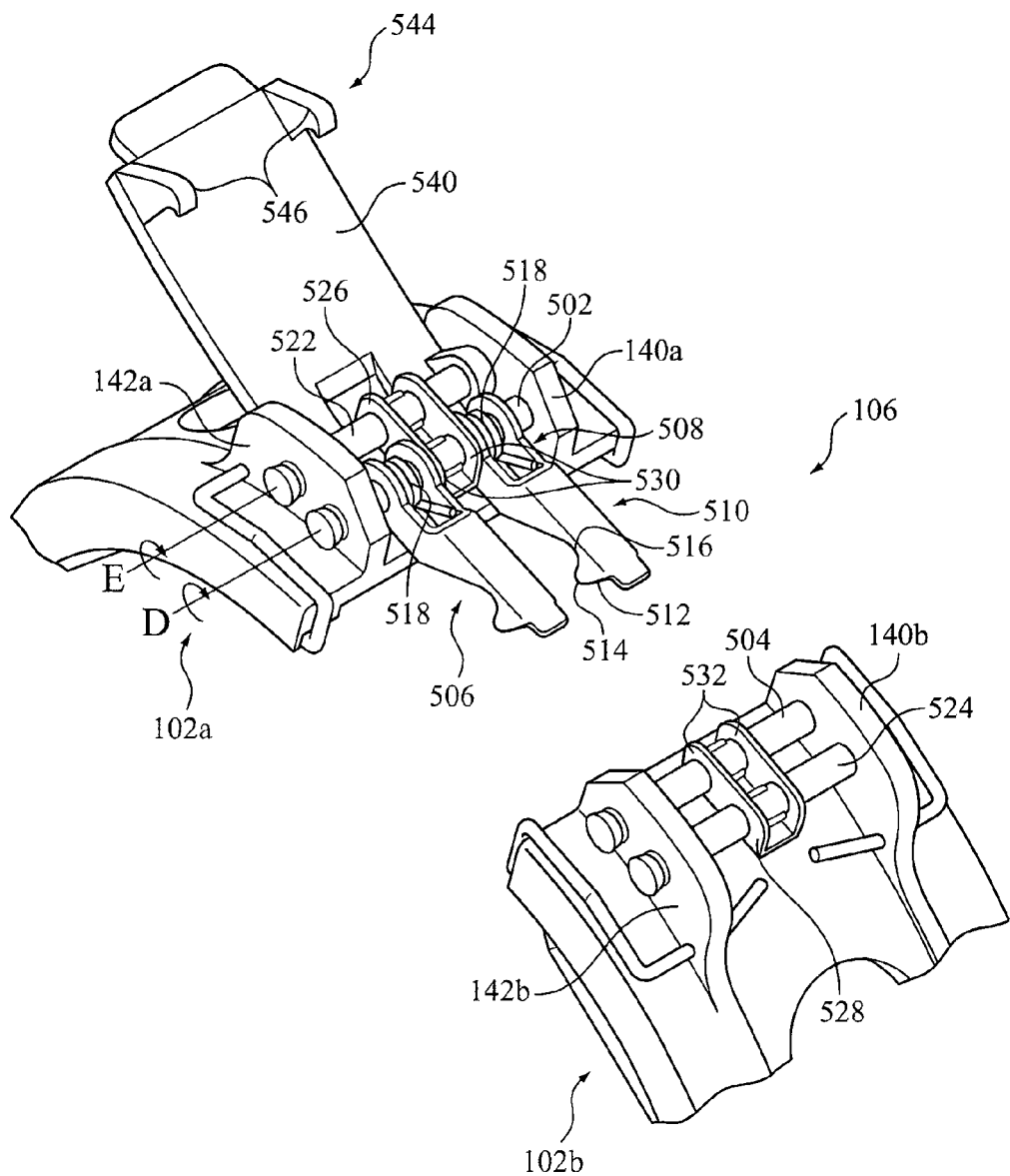
FIG. 5B illustrates a top perspective view of the releasable latching assembly 106 of the coupling assembly 100, where the first and second coupling members 102a,b are detached from each other.

With reference to FIGS. 5A and 5B, the latching assembly 106 includes a first axially extending support pin 502 that extends through openings formed in the third and fourth ears 140a, 142a of the first coupling member 102a and a second axially extending support pin 504 that extends through openings formed in the third and fourth ears 140b, 142b of the second coupling member 102b. The ends of the first and second support pins 502, 504 are enlarged (e.g., through swaging) to prevent removal of the support pins 502, 504 from the third and fourth ears 140a,b, 142a,b of the coupling members 102a,b.

The latching assembly 106 further includes a pair of latching members 506, each of which includes a mounting portion 508 rotatably mounted to the first support pin 502 and a latching portion 510 configured to latch onto the second support pin 504, when the coupling assembly 100 is in its closed position. The latching portion 510 of the latching member 506 includes a leading ramped surface 512, a trailing surface 514, and a locking groove 516 sized to receive the second support pin 504 mounted on the second coupling member 102b.

Due to the rotatable mounting of the latching members 506 relative to the first support pin 502, the latching members 506 are capable of rotating about an axis D defined by the first support pin 502 between a locking position and a releasing position. In its locking position (FIGS. 5A and 5B), each latching member 506 engages the second support pin 504 when the coupling assembly 100 is in its closed position. In its releasing position, each latching member 506 is rotated (e.g., in the counter-clockwise direction according to the views of FIGS. 5A and 5B) about the axis D to a position that provides sufficient clearance between the latching members 506 and the second support pin 504 to enable the coupling assembly to be moved to its open position.

The latching assembly 506 further includes a pair of biasing elements 518, each of which is configured to bias a respective latching member 506 to its locking position. Each biasing element 518 is capable of: i) resisting, yet permitting, rotation of a respective latching member 506 in the counter-clockwise direction about the axis D towards its releasing position and ii) returning each latching member 506 to its locking position without the need of additional force. It will be appreciated that the further the latching members 506 are rotated in the counter-clockwise direction, the greater the biasing force provided by the biasing elements 518. In the illustrated embodiment, the biasing elements 518 are torsion springs, each of which includes a coil surrounding the first support pin 502, a first arm extending from the coil and secured to the latching portion 510 of the latching member 506 and a second arm extending from the coil and secured to the first coupling member 102a. In alternative embodiments (not shown), instead of torsion springs, the biasing element 518 can be a leaf spring, wave spring, or other known biasing elements.

It will be appreciated that although a single latching member 506 and associated biasing element 518 maybe designed to withstand the operating loads of the coupling assembly 100, the second latching member and associated biasing element is employed as a redundant feature in the event that one of the latching members 506 should fail. In alternative embodiments (not shown), the coupling assembly 100 can include more than two latching members to provide additional redundancies.

With continued reference to FIGS. 5A and 5B, the latching assembly 106 also includes a redundant support pin structure for preventing removal of the support pins from the coupling assembly 100 in the event of a support pin swage failure or a support pin fracture. The redundant support pin assembly includes a second pair of axially extending pins (i.e., third and fourth support pins 522, 524) and a pair of truss members (i.e., first and second truss members 526, 528). The third support pin 522 is oriented parallel to the first support pin 502 and extends through openings formed in the third and fourth ears 140a, 142a of the first coupling member 102a, while the fourth support pin 524 is oriented parallel to the second support pin 504 and extends through openings formed in the third and fourth ears 140b, 142b of the second coupling member 102b. The ends of the third and fourth support pins 522, 524 are enlarged (e.g., through swaging) to prevent removal of the support pins 522, 524 from the respective ears 140a,b, 142a,b of the respective coupling members 102a,b.

In the illustrated embodiment, the first truss member 526 is a generally channel-shaped structure having parallel walls 530 with openings formed therethrough for receiving the first and third support pins 502, 522, respectively, to effectively couple the first support pin 502 to the third support pin 522. Similarly, the second truss member 528 is a generally channel-shaped structure having parallel walls 532 having openings therethrough for receiving the second and fourth support pins 504, 524, respectively, to effectively couple the second support pin 504 to the fourth support pin 524. To ensure that the support pins cannot be removed from the coupling assembly 100 after assembly, the support pins are crimped or otherwise deformed between the parallel walls 530, 532 of the truss members 526, 528, respectively. In combination, the truss members 526, 528 and the crimping of the support pins serve as a redundant feature to prevent removal of the support pins from the coupling assembly 100 in the event of a support pin swage failure or a support pin fracture.

With continued reference to FIGS. 5A and 5B, the coupling assembly 100 further includes a latch indicator 540 for verifying that the coupling assembly 100 is properly secured in its closed position by the latching assembly 106. The latch indicator 540 includes a mounting portion 542 rotatably mounted to the third support pin 522 and a latching portion 544 having a pair of latching projections 546 configured to engage the fourth support pin 524 only when the coupling assembly 100 is properly secured in its closed position by the latching assembly 106. Due to the rotatable mounting of the latch indicator 540 relative to the third support pin 522, the latch indicator 540 is capable of rotating about an axis E defined by the third support pin 522 between an open position and a closed position. In its open position (FIGS. 5A and 5B), the latch indicator 540 is disengaged from the fourth support pin 524. In its closed position, the latch indicator 540 is closed over the latching members 506 (e.g., by rotating the latch indicator 540 in the clockwise direction according to the views of FIGS. 5A and 5B) until its latching projections 546 engage the fourth support pin 524 when the coupling assembly 100 is in its closed position.

The latch indicator 540 serves as a visual and tactile indicator used to verify that the coupling assembly 100 is properly installed and secured over the fluid joint because it will only move to its closed position when the latching members 506 are properly secured to the second support pin 504. Additionally, when the latch indicator 540 is moved to its closed position, its latching projections 546 may provide an audible "click" indicating a closed condition. Once in its closed position, the latch indicator 540 ensures that the latching members 506 cannot be moved to their releasing positions unless the latch indicator 540 is moved to its open position.

In one embodiment, the latch indicator 540 is constructed of a suitable material, such as a thermoplastic organic polymer, that would prevent any chance of a spark gap occurrence as required by FAR 25.981. A suitable exemplary thermoplastic organic polymer includes polyetheretherketone (PEEK). In an alternative embodiment, the latch indicator 540 can be constructed of a metallic material.

Figure 6A:
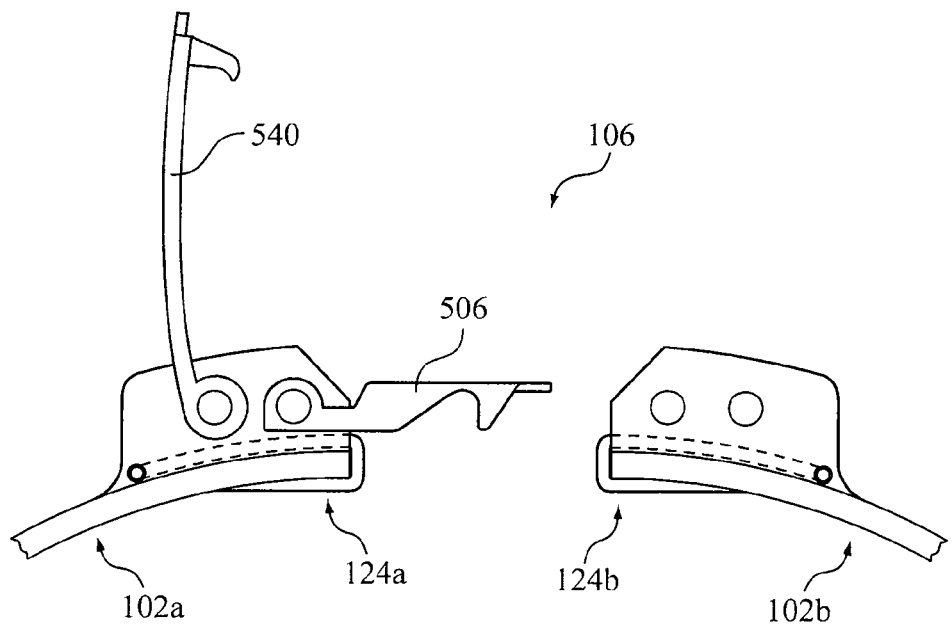
FIGS. 6A-6E illustrate cross-sectional views of the latching assembly 106 at various stages during movement of the coupling assembly 100 from its open position to its closed position.
Figure 6B:
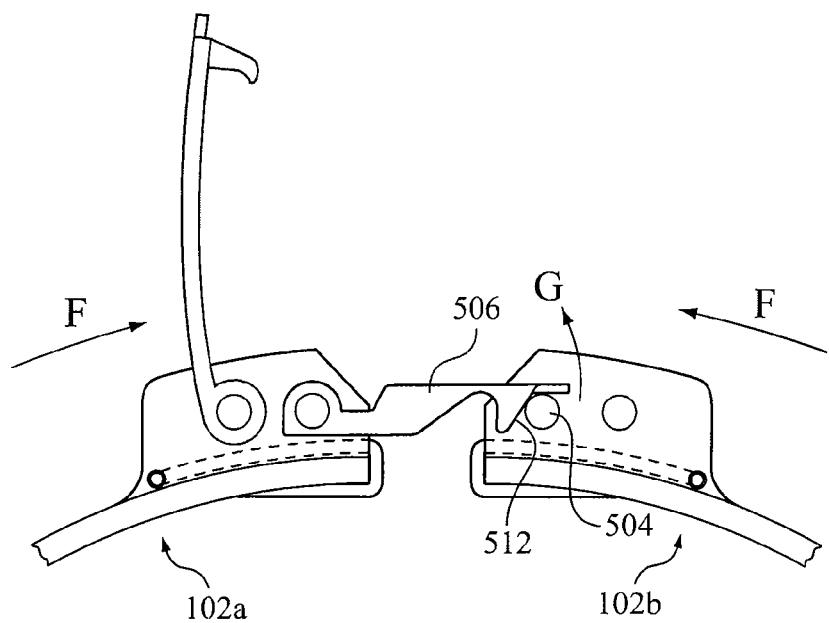
Figure 6C:
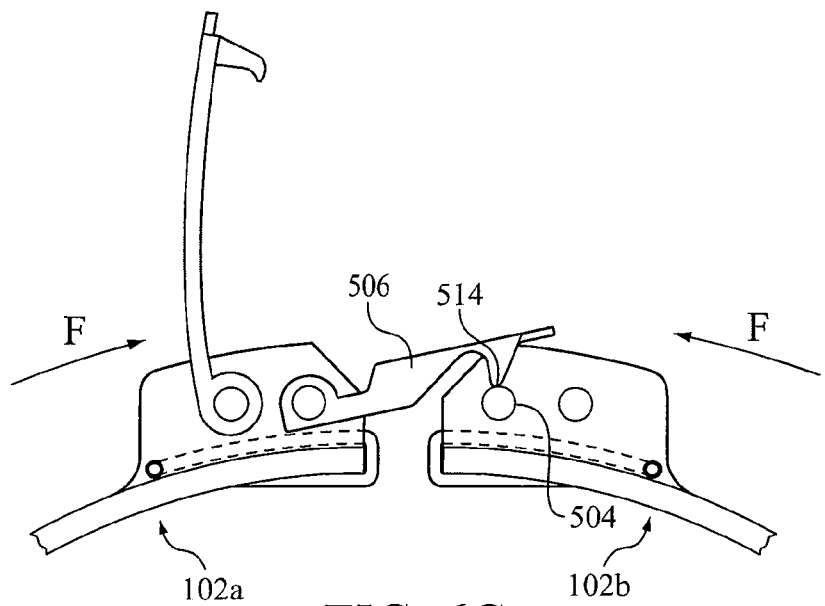
Figure 6D:
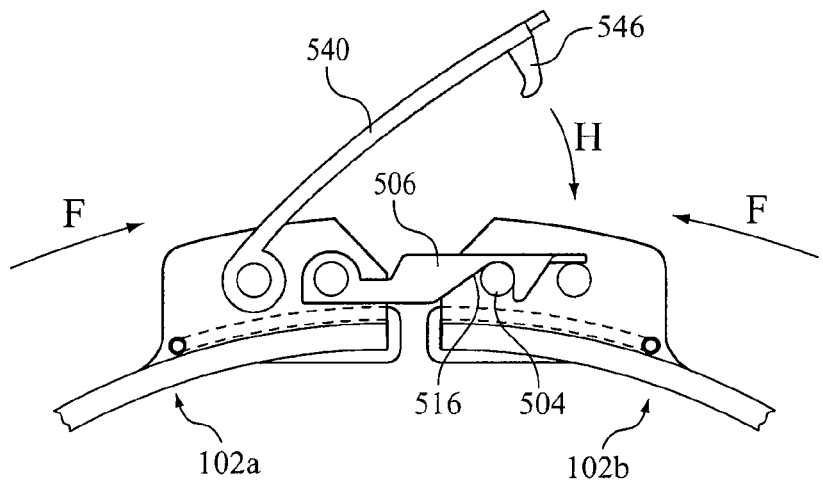
Figure 6E:
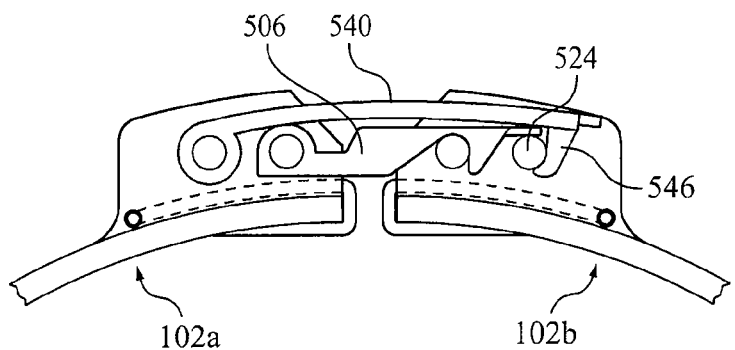

FIGS. 6A-6E illustrate cross-sectional views of the latching assembly 106 at various stages during movement of the coupling assembly 100 from its open position to its closed position. As shown in FIG. 6A, the second ends 124a,b of the coupling members 102a,b are in a confronting position, the latching members 506 are biased to their locking positions, and the latch indicator 540 is in its open position. Upon continued rotation of the coupling members 102a,b towards each other (in the direction of arrows F), the leading ramped surface 512 of each latching member 506 comes into contact with the second support pin 504 (FIG. 6B). Upon further rotation of the coupling members 102a,b towards each other, the second support pin 504 forces each latching member 506 to rotate counter-clockwise (in the direction of arrow G) towards its releasing position against the urging of a respective biasing element 518 (not shown). Each latching member 506 continues to rotate counter-clockwise until the trailing surface 514 of each latching member 506 cams over the second support pin 504 (FIG. 6C). Upon further rotation of the coupling members 102a,b towards each other, the latching members 506 return or "snap back" to their locking positions over the second support pin 504 due to the resiliency of the biasing element 518, such that the second support pin 504 is received by the locking grooves 516 in the latching members 506 (FIG. 6D). In their locking positions, the latching members 506 lock the coupling assembly 100 in its closed position, such that the first and second coupling members 102a,b are not movable relative to each other. To complete the coupling operation, the latch indicator 540 is rotated in the clockwise direction (in the direction of arrow H) as shown in FIG. 6D from its open position toward its closed position. The latch indicator 540 is rotated until its latching projections 546 engage the fourth support pin 524 and snap in place to its closed position (FIG. 6E). Once in its closed position, the latch indicator 540 ensures that the latching members 506 cannot be moved to their releasing positions.

When moved from its open position to its closed position, the coupling assembly 100 closes over the sleeve 112 to create a pressure seal between the sleeve 112, the ferrules 110a,b, and the sealing members 116a,b. When in its closed position, the coupling assembly 100 is also configured to create an electrical continuity path across the ferrules 110a,b, which will be discussed in further detail below.

If it is necessary to unlock the coupling assembly 100, the latch indicator 540 is first disengaged from the fourth support pin 524 by lifting the free end of the latch indicator 540 and rotating it in a counter-clockwise direction. Then, the latching members 506 are disengaged from the third support pin 504 by lifting the free ends of the latching members 506 and rotating them in a counter-clockwise direction until they reach their releasing positions. Once the latching members 506 are moved to their releasing positions, the coupling assembly 100 can be moved to its open position. It will be appreciated that inadvertent unlocking of the coupling assembly 100 is prevented because such unlocking requires simultaneous manipulation of both of the latching members 506.

In the coupling assembly 100 described above, with the exception of the latch indicator 540, all of the components of the coupling assembly 100 (e.g., coupling members, support pins, latching members, torsion springs, truss members, hinge assembly components, and hinge pins) are preferably constructed of metallic materials. It will be appreciated that the appropriate metallic material for a particular component is selected based on the loading requirements of that component within the coupling assembly 100.

In the coupling assembly 100 described above, all of the metallic components of the coupling assembly 100 are electrically bonded simultaneously to both ferrules 110a,b of the fluid joint and the sleeve 112 with a built in bond path adequate to disband accumulation of static electrical charge. In one embodiment, with the exception of the inside surface of the coupling member lips 144a,b, 148a,b including the grooves 146a,b, 150a,b and the inside diameter of the holes in the ears that receive the hinge and support pins, all of the metallic parts are anodized for electrical insulative purposes. The remaining areas are coated with an electrical conductive chemical conversion coating that allows all of the metallic parts to have an electrical bond path to ground to the bonding wires. Suitable coatings that can be used include, without limitation, electroless nickel, nickel Teflon, or any other suitable coatings. These conductive coatings provide an additional means by which conductivity is maintained across the coupling assembly 100, thereby further eliminating the possibility of an electrostatic charge buildup.

Based on the foregoing, the coupling assembly 100 described above and illustrated in the figures provides a number of advantages. For example, the addition of a redundant hinge structure is capable of withstanding the operating loads of the coupling assembly in the event that the primary hinge fails. Additionally, the employment of redundant hinge pin and support pin structures prevent inadvertent removal of the hinge pins from the coupling assembly in the event of a hinge pin swage failure or a hinge pin fracture. Because of these redundant structures (including the presence of two latching members), there are no identifiable single point failures in the coupling assembly, including failures due to manufacturing variability, aging, wear, corrosion, and likely damage as required by FAR 25.981. Furthermore, the employment of bonding elements that contact the sleeve provide for electrical bonding between the coupling assembly and the sleeve. Finally, the addition of a latch indicator ensures that the latching members are properly engaged and prevent inadvertent movement of the latching members to their releasing positions.

Although an example of the coupling assembly is described in an aircraft application, it will be appreciated that the coupling assembly may be used in other applications, such as ground, space, maritime, or petroleum applications.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or multiple components. Moreover, the components in this application are sometimes described with reference to an "end" of such component. As used herein, the term "end" should be interpreted broadly, such that it includes not only the termination edge of the component, but also could include a portion that extends from the termination edge of such component to any point approaching the midpoint of such component.

While the present application illustrates various embodiments, and while these embodiments have been described in some detail, it is not the intention of the applicant to restrict or in any way limit the scope of the claimed invention to such detail. Additional advantages and modifications will readily appear to those skilled in the art. Therefore, the invention, in its broader aspects, is not limited to the specific details and illustrative examples shown and described. Accordingly, departures may be made from such details without departing from the spirit or scope of the applicant's claimed invention. Moreover, the foregoing embodiments are illustrative, and no single feature or element is essential to all possible combinations that may be claimed in this or a later application.

What is claimed is:

1. A coupling assembly and a sleeve, the coupling assembly being configured for releasably interconnecting a fluid joint that includes confronting ends of a pair of fluid conveying members, each of which has a ferrule fixedly attached thereto, and the sleeve circumferentially surrounding the ferrules, the coupling assembly comprising:

a pair of coupling members, including a first coupling member and a second coupling member each of which has a first end and a second end and each having a hole disposed therein;

a hinge assembly configured to hingedly connect the first ends of the coupling members to permit them to rotate relative to each other between an open position and a closed position where the coupling members surround the sleeve, wherein the hinge assembly includes a first axially extending hinge pin connected to the first end of the first coupling member, a second axially extending hinge pin connected to the first end of the second coupling member, and a primary hinge having first and second openings for receiving the first hinge pin and third fourth openings for receiving the second hinge pin to permit the first coupling member to rotate relative to the primary hinge pin t permit the first coupling member to rotate relative to the primary hinge about an axis defined by the first hinge pin and the second coupling member to rotate relative to the primary hinge about an axis defined by the second hinge pin;

a redundant support pin structure, including a third hinge pin secured to the first coupling member adjacent and parallel to the first hinge pin, a fourth hinge pin secured to the second coupling member adjacent and parallel to the second hinge pin, a first truss member coupled between the first and third hinge pins and a second truss member coupled between the second and fourth hinge pins;

a pair of bonding wires, each of which is coupled to a respective coupling member and configured to electrically bond the respective coupling member to the ferrules of respective fluid conveying members;

a releasable latching assembly configured to releasably secure the second ends of the coupling members together when they are in their closed position; and a pair of bonding members, including a first bonding member and a second bonding member, each of which is externally mounted to a respective coupling member and makes direct contact with an outer surface of the sleeve, wherein each of the bonding members is configured to electrically bond the respective coupling member to the sleeve, wherein the first bonding member includes a mounting portion coupled to the first and third hinge pins and a finger portion that extends through the hole in the first coupling member to directly contact the sleeve, and wherein the second bonding member includes a mounting portion coupled to the second and fourth hinge pins and a finger portion that extends through the hole in the second coupling member to directly contact the sleeve.

2. The coupling assembly and sleeve of claim 1, wherein each coupling member includes a pair of radially inward extending lips having an inwardly facing annular groove formed therein for receiving portions of a respective bonding wire.

3. The coupling assembly and sleeve of claim 1, wherein the first coupling member includes a first pair of opposing, radially outward extending ears adjacent its first end and a second pair of opposing, radially outward extending ears adjacent its second end, wherein the second coupling member includes a first pair of opposing, radially outward extending ears adjacent its first end and a second pair of opposing, radially outward extending ears adjacent its second end.

4. The coupling assembly and sleeve of claim 3, wherein the first axially extending hinge pin is mounted to the first pair of ears of the first coupling member, and the second axially extending hinge pin is mounted to the first pair of ears of the second coupling member.

5. The coupling assembly and sleeve of claim 4, wherein ends of the first and second hinge pins are swaged to prevent their removal from respective ears of respective coupling members.

6. The coupling assembly and sleeve of claim 5, wherein the hinge assembly further includes a redundant hinge structure that includes a pair of chain links, each of which is positioned between adjacent ears of the first and second coupling members and the swaged hinge pin ends, each of which has openings for receiving the first and second hinge pins.

7. The coupling assembly and sleeve of claim 4, wherein the third hinge pin is mounted to the first pair of ears of the first coupling member and spaced-apart from the first hinge pin in a direction away from the first end of the first coupling member, and the fourth hinge pin is mounted to the first pair of ears of the second coupling member and spaced-apart from the second hinge pin in a direction away from the first end of the second coupling member.

8. The coupling assembly and sleeve of claim 7, wherein the first truss member is a channel-shaped structure having parallel walls provided with openings for receiving the first and third hinge pins, wherein the second truss member is a channel-shaped structure having parallel walls provided with openings for receiving the second and fourth hinge pins, wherein each hinge pin is deformed at a location between the parallel walls of the truss member to prevent the hinge pin from being removed from a respective one of the pair of coupling members.

9. The coupling assembly and sleeve of claim 3, wherein the releasable latching assembly includes a first axially extending support pin mounted to the second pair of ears of the first coupling member, a second axially extending support pin mounted to the second pair of ears of the second coupling member, and a pair of latching members rotatably mounted to the first support pin to permit the latching members to rotate about an axis defined by the first support pin between a releasing position and a locking position where each of the pair of latching members is secured to the second support pin mounted on the second coupling member when the first and second coupling members are in their closed position.

10. The coupling assembly and sleeve of claim 9, wherein ends of the first and second support pins are swaged to prevent their removal from respective ears of respective coupling members.

11. The coupling assembly and sleeve of claim 9, wherein each latching member includes a leading ramped surface, a trailing surface, and a locking groove configured to receive the second support pin mounted on the second coupling member when the first and second coupling members are in their closed position.

12. The coupling assembly and sleeve of claim 11, wherein the releasable latching assembly includes a pair of biasing elements, each configured to bias a respective latching member to its locked position.

13. The coupling assembly and sleeve of claim 11, wherein the releasable latching assembly further includes a redundant support pin structure that includes a third axially extending support pin mounted to the first pair of ears of the first coupling member and spaced-apart from the first support pin in a direction away from the first end of the first coupling member, a fourth axially extending support pin mounted to the first pair of ears of the second coupling member and spaced-apart from the second support pin in a direction away from the first end of the second coupling member, a first latch assembly truss member coupled between the first and third support pins and a latch assembly second truss member coupled between the second and fourth support pins.

14. The coupling assembly and sleeve of claim 13, wherein the first latch assembly truss member is a channel-shaped structure having parallel walls provided with openings for receiving the first and third support pins, wherein the second latch assembly truss member is a channel-shaped structure having parallel walls provided with openings for receiving the second and fourth support pins, wherein each support pin is deformed at a location between the parallel walls of the respective latch assembly truss member to prevent the hinge pin from being removed from a respective one of the pair of coupling members.

15. The coupling assembly and sleeve of claim 9, further comprising a latch indicator configured to be moved from an open position to a closed position over the releasable latching assembly only when the second ends of the coupling members are secured together by the releasable latching assembly.

16. The coupling assembly and sleeve of claim 1, wherein a bridge section of one of the bonding wires is captured between and directly contacts the first bonding member and the third hinge pin, thereby forming an electrical bond, wherein a bridge section of the other bonding wire is captured between and directly contacts the second bonding member and the fourth hinge pin, thereby forming an electrical bond.

17. A coupling assembly for releasably interconnecting a fluid joint that includes confronting ends of a pair of fluid conveying members, each of which has a ferrule fixedly attached thereto, and a sleeve circumferentially surrounding the ferrules, the coupling assembly comprising:
  a pair of coupling members, each of which has a first end and a second end;
  a hinge assembly configured to hingedly connect the first ends of the coupling members to permit them to rotate relative to each other between an open position and a closed position where the coupling members surround the sleeve;
  a pair of bonding wires, each of which is coupled to a respective coupling member and configured to electrically bond the respective coupling member to the ferrules of respective fluid conveying members;
  at least a pair of latching members rotatably mounted to a first support pin attached to one of the coupling members adjacent its second end and configured to releasably engage a second support pin attached to the other coupling member adjacent its second end when the coupling members are in their closed position; and
  a redundant support pin structure configured to prevent inadvertent removal of the first and second support pins from their respective coupling members in the event of a support pin failure,
    wherein the redundant support pin structure includes a third support pin secured to the coupling member adjacent and parallel to the first support pin, a fourth support pin secured to the coupling member adjacent and parallel to the second support pin, a first truss member coupled between the first and third support pins and a second truss member coupled between the second and fourth support pins; and a pair of bonding members, each of which is externally mounted to a respective coupling member, and extends to contact the sleeve without contacting any other components.

18. The coupling assembly of claim 17, wherein the first truss member is a channel-shaped structure having parallel walls provided with openings for receiving the first and third support pins, wherein the second truss member is a channel-shaped structure having parallel walls provided with openings for receiving the second and fourth support pins, wherein each support pin is deformed at a location between the parallel walls of the truss member to prevent the hinge pin from being removed from a respective one of the pair of coupling members.

* * * * *